(12) United States Patent
Seiler

(10) Patent No.: US 8,281,174 B2
(45) Date of Patent: Oct. 2, 2012

(54) ENERGY SAVING OPERATION OF A HARDWIRED COMMUNICATION INTERFACE AND A FUNCTION UNIT PROVIDED FOR THE COMMUNICATION INTERFACE OF A FIELD DEVICE

(75) Inventor: Christian Seiler, Auggen (DE)

(73) Assignee: Endress + Hauser Process Solutions AG, Reinach (CH)

( * ) Notice: Subject to any disclaimer, the term of this patent is extended or adjusted under 35 U.S.C. 154(b) by 335 days.

(21) Appl. No.: 12/451,936

(22) PCT Filed: Oct. 8, 2008

(86) PCT No.: PCT/EP2008/063470
§ 371 (c)(1),
(2), (4) Date: Dec. 8, 2009

(87) PCT Pub. No.: WO2009/047268
PCT Pub. Date: Apr. 16, 2009

(65) Prior Publication Data
US 2010/0222895 A1 Sep. 2, 2010

(30) Foreign Application Priority Data
Oct. 9, 2007 (DE) .......................... 10 2007 048 476

(51) Int. Cl.
*G06F 1/32* (2006.01)
*G08B 1/08* (2006.01)
(52) U.S. Cl. ...................... 713/323; 713/322; 340/539.3
(58) Field of Classification Search .................. 713/322, 713/320, 323
See application file for complete search history.

(56) References Cited

U.S. PATENT DOCUMENTS

| 6,208,247 | B1 * | 3/2001 | Agre et al. ............... 340/539.19 |
| 6,934,870 | B1 * | 8/2005 | Amos ........................... 713/501 |
| 7,194,363 | B2 | 3/2007 | Schaffer |
| 2003/0171827 | A1 * | 9/2003 | Keyes et al. ..................... 700/19 |
| 2005/0122926 | A1 * | 6/2005 | Cromer et al. .................. 370/311 |
| 2005/0245291 | A1 * | 11/2005 | Brown et al. .................. 455/572 |
| 2006/0116102 | A1 | 6/2006 | Brown |
| 2007/0161352 | A1 | 7/2007 | Dobrowski |
| 2008/0211664 | A1 * | 9/2008 | Griech et al. ............... 340/539.1 |
| 2008/0291009 | A1 * | 11/2008 | Nelson et al. .............. 340/539.3 |

FOREIGN PATENT DOCUMENTS

| DE | 10 2004 020 393 | 11/2005 |
| DE | 10 2006 009 979 | 9/2007 |
| EP | 1 862 877 | 12/2007 |
| WO | WO 2007/039577 | 4/2007 |

* cited by examiner

*Primary Examiner* — Chun Cao
(74) *Attorney, Agent, or Firm* — Bacon & Thomas, PLLC

(57) ABSTRACT

A field device of process automation technology which includes a hardwire communication interface and a functional unit associated with the communication interface. The functional unit is embodied in such a manner, that it performs sending and/or receiving of digital signals via the communication interface. The field device is embodied in such a manner, that the functional unit is operable in a clocked manner, wherein, in the clocked operation, active time periods, in which the functional unit is activated, alternate with turned-off periods of time, in which the functional unit is switched off.

19 Claims, 2 Drawing Sheets

ENERGY SAVING OPERATION OF A HARDWIRED COMMUNICATION INTERFACE AND A FUNCTION UNIT PROVIDED FOR THE COMMUNICATION INTERFACE OF A FIELD DEVICE

TECHNICAL FIELD

The present invention relates to a field device of process automation technology, as well as to a method for operating a field device of process automation technology.

BACKGROUND DISCUSSION

In process automation technology, field devices are often applied that serve for registering and/or influencing process variables. For registering process variables, sensors, such as, for example, fill level measuring devices, flow measuring devices, pressure and temperature measuring devices, pH, redox potential measuring devices, conductivity measuring devices, etc., serve to register the corresponding process variables, fill level, flow, pressure, temperature, pH-value, and conductivity. Serving for influencing process variables are actuators, such as, for example, valves or pumps, via which the flow of a liquid in a pipeline section, or the fill level in a container, can be changed. In principle, all devices are referred to as field devices which are applied close to the process and which deliver, or process, information relevant to the process. Besides the above named sensors and actuators, such units are also generally referred to as field devices, which are directly connected to a fieldbus and which serve for communication with superordinated units, examples of these kinds of field devices including remote I/Os, gateways, linking devices, and wireless adapters. A large number of such field devices are produced and sold by the firm, Endress+Hauser.

In modern industrial plants, field devices are, as a rule, connected with superordinated units via bus systems (Profibus®, Foundation® Fieldbus, HART®, etc.). Normally, superordinated units are control systems or control units, such as, for example, PLCs (programmable logic controllers). The superordinated units serve, among other things, for process control, process visualizing, process monitoring, as well as for field device start-up. The registered, measured values of the field devices, especially values from sensors, are transmitted via the particular bus system to one, or, in given cases, to a number of, superordinated unit(s). In addition, data transmission from the superordinated unit via the bus system to the field devices is also required, especially for configuring and parametering field devices, as well as for actuator operation.

Besides hardwired data transmission between field devices and superordinated unit, there is also the opportunity for wireless data transmission. Especially in the bus systems, Profibus®, Foundation® Fieldbus and HART®, wireless data transmission via radio is provided for. Additionally, radio or wireless networks for sensors according to the standard, IEEE 802.15.4, are specified in greater detail. For implementing wireless data transmission, newer field devices, especially sensors and actuators, are, in part, embodied as radio field devices. These have, as a rule, a radio unit and an electrical current source as integral components. In such case, the radio unit and the electrical current source can be provided in the field device itself or in a radio module permanently connected to the field device. By the electrical current source, a self-sufficient, or autarkic, energy supply of the field device is enabled.

Along with that, the opportunity exists to adapt field devices, especially sensors and actuators, lacking radio units by connecting a wireless adapter to the field device. The wireless adapter has a radio unit, so that the field device becomes a radio field device. Such a wireless adapter is described, for example, in the publication WO 2005/103851 A1. The wireless adapter is, as a rule, releasably connected to a fieldbus communication interface of the field device (especially, an interface of a sensor or actuator). Via the fieldbus communication interface, the field device (especially a sensor or actuator) can transmit the data to be transmitted via the bus system to the wireless adapter, which then transmits these via radio to the target location. Conversely, the wireless adapter can receive data via radio and forward such via the fieldbus communication interface to the field device (especially a sensor or actuator). Supply of the field device (especially the sensor or actuator) with electrical power occurs, as a rule, via an electrical current source of the wireless adapter.

In the case of such radio field devices and wireless adapters, the communication (for example with a superordinated unit) is conducted, as a rule, via the wireless interface of the radio field device or the wireless adapter. Additionally, such radio field devices or wireless adapters include, as a rule, a hardwire communication interface. For example in the HART® standard, it is provided that radio field devices must have, besides a wireless interface, also a hardwire communication interface. Via such a hardwire communication interface, for example, an on-site configuring of the radio field device or the wireless adapter is possible via a service unit, such as, for example, a handheld communicator, connected to the hardwire communication interface. Additionally, the hardwire communication interface can be embodied as a fieldbus communication interface, so that communication is conducted, by way of such, over a bus system, such as, for example, one of the standardized bus systems, Profibus®, Foundation® Fieldbus or HART®. Via such a fieldbus communication interface, the radio field device or the wireless adapter can be connected also to a correspondingly hardwired fieldbus.

The electrical current source of a wireless adapter or of a radio field device is based, for example, on a primary battery, a fuel cell, and/or rechargeable battery, etc., provided in the wireless adapter or in the radio field device. Especially when a field device is embodied as a radio field device or as wireless adapter and is supplied with electrical power via a self-sufficient, or autarkic, electrical current source, or when a field device (especially a sensor or an actuator) supplies a connected wireless adapter with electrical power from the electrical current source, the power consumption of the relevant field device should be minimized. In this way, the lifetime of the electrical current source can be lengthened and, accordingly, the amount of maintenance work to be performed can be reduced. Also in the case of conventional field devices, which are connected to a fieldbus via a hardwire communication interface (fieldbus communication interface), a reduction of energy consumption is desired on cost and environmental grounds.

In times when a field device does not have to do anything, especially in the periods of time between measured value queries, configuration procedures and/or commands for performing a particular action, the relevant field device is, as a rule, placed in a standby mode. Especially, the above described wireless radio field devices and wireless adapters have very low power consumption in standby mode. They require, as a rule, only a few µA, especially less than 10 µA, of electrical current supply. Associated with the above described, hardwire communication interface in the device architecture is a functional unit, by which the sending and/or receiving of digital signals is performed via the hardwire communication interface. The power consumption of such a functional unit is clearly higher than the power consumption of a wireless radio field device or wireless adapter in standby mode. If the functional unit is formed, for example, by an ASIC (application specific integrated circuit), such requires, as a rule, an electrical current supply of more than 100 µA.

SUMMARY OF THE INVENTION

On the basis of these considerations, an object of the present invention is to provide a field device, as well as a method for operating a field device, which assure permanent availability of a hardwire communication interface and, simultaneously, operation with low power consumption.

The object is achieved by a field device comprising: a hardwire communication interface; and a functional unit associated with said hardwire communication interface, said functional unit is embodied in such a manner, that it performs sending and/or receiving of digital signals via the hardwire communication interface, wherein: the field device is embodied in such a manner, that said functional unit can be operated in clocked operation, wherein, in the clocked operation, active time periods, in which the functional unit is activated, alternate with turned-off periods of time, in which the functional unit is switched off, as well as by a method; for operating a field device of process automation technology, wherein the field device includes a hardwire communication interface and, a functional unit associated with the hardwire communication interface comprising the steps of: the functional unit performs sending and/or receiving of digital signals via the communication interface, and operating the functional unit in clocked operation, wherein: in the clocked operation, active time periods, in which the functional unit is activated, alternate with turned-off periods of time, in which the functional unit is switched off. as defined in claim 9. Advantageous further developments of the invention are set In the present invention, a field device of process automation technology, especially a sensor, an actuator, and/or a wireless adapter, is provided with a hardwire communication interface and with a functional unit associated with the communication interface. The functional unit is embodied in such a manner that it performs the sending and/or receiving of digital signals via the communication interface. The field device is embodied in such a manner, that the functional unit is operationally clocked, such that it alternates between active time periods, in which the functional unit is activated, and turned-off periods of time, in which the functional unit is switched off.

The field device can be embodied, especially, as a sensor, an actuator or a wireless adapter, which, for example, is connectable to a sensor or actuator (or, in general, a field device), or also as a remote I/O, a gateway, or a linking device. In the following explanation of the patent claims, accordingly, the term "field device" is meant to be a general reference to these alternatives.

In the sending of digital signals via the communication interface, the functional unit converts, especially, obtained digital data (e.g. a bit stream), which, for example, were obtained from a control unit of the field device, into corresponding physical signals to be transmitted via the communication interface. Since these physical signals to be transmitted via the communication interface represent digital data, they are referred to as digital signals. In the case of receiving digital signals via the communication interface, which, for example, are obtained from a thereto connected service unit, the functional unit converts such into digital data. If the communication via the communication interface occurs, for example, according to the HART® standard, then, in the sending, digital signals are superimposed by the functional unit according to the FSK (Frequency Shift Keying) standard on an electrical current signal (4-20 mA electrical current signal), while the functional unit, in receiving digital signals, converts them into digital data, also on the basis of the FSK standard. In the case of the Profibus® standard, the sending and/or receiving of digital signals occurs via the communication interface by the functional unit, as a rule, according to the RS 485 standard (primarily in the case of PROFIBUS® DP and PROFIBUS® FMS).

In the present invention, during clocked operation of the functional unit, there is an alternation between active time periods and turned-off time periods. During the turned-off time periods, the functional unit is preferably completely switched off and, accordingly, requires no electrical power. In this way, the power consumption can be reduced. Depending on the ratio of the length of the turned-off time periods to the active time periods, the power consumption can be reduced around 99%, or more, compared to continuous operation of the functional unit. During the active time periods, the functional unit can receive (and transmit) digital signals, so that the functional unit is available for communication via the communication interface during these times. In this way, by operating the functional unit in a clocked manner, a permanent availability of the communication interface with low power consumption is achieved.

In the present invention, additionally, a method is provided for operating a field device of process automation technology, especially a sensor, an actuator and/or a wireless adapter. The field device includes a hardwire communication interface and a functional unit associated with the communication interface, wherein the sending and/or receiving of digital signals via the communication interface is performed by the functional unit. The functional unit is operated in a clocked manner, wherein it alternates in clocked operation between active time periods, in which the functional unit is activated, and turned-off periods of time, in which the functional unit is switched off.

The above explained advantages and features with reference to the field device of the invention are also implementable in corresponding manner with the method of the invention. The subsequently explained further developments and advantages, as well as the further developments set forth in the dependent patent claims, are implementable both with the field device of the invention as well as also with the method of the invention.

In an advantageous further development of the invention, the active time periods and the turned-off time periods follow one another periodically. This means that the active time periods, in each case, are equally long and the turned-off time periods, in each case, are equally long, so that a periodic sequence results. Preferably, the active time periods are shorter than the turned-off time periods, so that the power consumption can be effectively reduced.

Additionally, according to an advantageous further development, the functional unit is operated in clocked operation, at least when the field device is operated in a standby mode. In this way, during times in which the field device must not process measured value requests nor execute some other action, the field device can be operated in an energy saving, standby mode and the functional unit in energy saving, clocked operation. In this way, the power consumption is reduced further.

In an advantageous further development, when a digital signal is recognized at the functional unit, the field device is then switched into active operation. Preferably, in this case, the functional unit also is activated durably. For registering a digital signal incoming to the communication interface, the functional unit preferably includes a carrier detect logic. This detects, for example, whether a valid, information containing, digital signal is being received and distinguishes such from noise. The digital signal is, in such case, as a rule, received at an external device, such as, for example, a service unit connected to the communication interface or a superordinated unit which is connected with the communication interface via a fieldbus. In case a control unit (for example a CPU or a microprocessor) of the field device is correspondingly embodied (especially in the case of Foundation® Fieldbus), a communication can also be initiated by this control unit and the functional unit can then be durably activated. By switching the field device into active operation, such can, especially upon receipt of a measured value request or a command, perform a corresponding measurement, or execute an action corresponding to the command. Because the functional unit is activated durably, it can receive digital signals completely and carry out the communication. Preferably the functional unit remains in an active state long enough that the communication procedure can be completely finished. Alternatively it can also be provided that the functional unit remains for a predetermined time in the durably active state. Then the functional unit is preferably switched back into clocked operation.

In an advantageous further development of the invention, a device connected to the communication interface and/or a control unit provided in the field device, before performing a communication, send(s) a predetermined wake-up signal of a length, which is preferably longer than a turned-off period of time of the functional unit. In this way, it is assured that the functional unit receives the wake-up signal during an active time interval and therewith can perform the additional steps required for performing the communication. Preferably, the wake-up signal has a predetermined structure, such as, for example, a signal corresponding to a bit stream of alternating "1" and "0" or a signal that has a predetermined, constant frequency. Alternatively to a wake-up signal of a certain length, a wake-up signal can also be sent a number of times. Both in the case of a continuing as well as also in the case of a repeated wake-up signal, it can be provided that such is sent until receipt of the wake-up signal is confirmed by the functional unit.

In an advantageous further development, it is provided that the communication interface is formed by a fieldbus communication interface. Accordingly, a communication occurs via the fieldbus communication interface digitally according to the particular fieldbus system. Preferably, one of the following, standardized bus systems is applied as bus system: Profibus®, Foundation® Fieldbus or HART®. The bus system HART® is preferred due to its frequent application and due to its good suitability for use in radio, or wireless, networks. Additionally, according to an advantageous further development, it is provided that a service unit is connectable to the communication interface and that communication can occur between the service unit and the field device via the communication interface. A service unit can be, for example, a handheld communicator (a hand portable parametering, and/or configuration, device), which is available from different field device manufacturers and by which the configuration and/or parametering of field devices can be performed on-site. Additionally, such a service unit can also be a laptop or computer connected to the communication interface via a corresponding interface. Preferably, communication occurs also in the case in which the communication interface is embodied for connection to a service unit. Alternatively, it can also be provided that the communication interface is embodied exclusively as a service communication interface (proprietary interface), thus only enabling a manufacturer-specific communication.

In an advantageous further development, the functional unit is implemented in layers 1 and 2 of the OSI reference model (open systems interconnection reference model), preferably exclusively in layer 1 of the OSI reference model. In an advantageous further development, the functional unit is implemented as a separate circuit, wherein, for this, especially an ASIC (application specific integrated circuit), a FPGA (field programmable gate array) or a FPLA (field programmable logic array) is suitable. FPGAs (and also FPLAs) include programmable, logic components and programmable connecting lines with controllable switches between these components. The actual functioning of such FPGAs (and FPLAs) is established by programming, so that equal FPGAs can, by corresponding programming, be applied for different functions and applications. Alternatively, for implementing the functional unit as a separate circuit, these can also be integrated into the control unit of the field device.

In an advantageous further development, the field device communicates via a wireless connection, preferably via radio, with a superordinated unit. Especially, the field device can have, supplementally, a wireless fieldbus communication interface, wherein the wireless fieldbus communication interface is embodied preferably according to the Profibus® standard, the Foundation® Fieldbus-standard or the HART® standard. As explained in the introductory part of the description, the field device can, in such case, itself, have such a wireless fieldbus communication interface or such a wireless fieldbus communication interface can be provided in a wireless adapter, which is connected (as a rule, via a hardwired interface) to the field device. Preferably the field device is supplied autarkically with electrical power. Especially, in this case, the achieved reduction in power consumption by the field device and method of the invention is advantageous. Such a self-sufficient electrical current source for supplying the field device can, in such case, be provided in the field device itself. If a conventional field device (especially a sensor or an actuator) is retrofitted to become a radio field device by connection of a wireless adapter, the self-sufficient electrical current source for the field device (especially for the sensor or actuator) can then also be provided in the wireless adapter.

BRIEF DESCRIPTION OF THE DRAWINGS

Other advantages and utilities of the invention will become evident on the basis of the subsequent description of examples of embodiments with reference to the appended drawing, the figures of which show as follows.

DETAILED DISCUSSION IN CONJUNCTION WITH THE DRAWINGS

Figure 1:
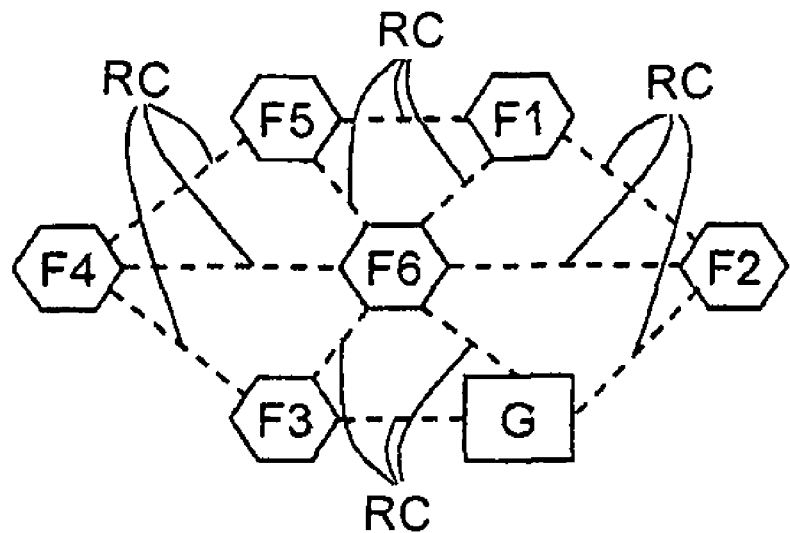
FIG. 1 is a schematic drawing of a radio network having a plurality of field devices.

FIG. 1 shows a radio network having a plurality of field devices F1, F2, . . . , F6 (each of which is embodied as a radio field device) and a gateway G. The field devices F1, F2, F6 and the gateway G are all connected with one another via radio connections RC, which are indicated in FIG. 1 by the dashed lines. Because the field devices F1, F2, ..., F6 and the gateway G are connected together via a plurality of radio connections RC, even in the case of failure of one of the radio connections RC, communication can still be maintained via the other radio connections RC. Frequency hopping, spread spectrum (FHSS) or direct sequence, spread spectrum (DSSS) methods, for example, are suitable radio transmission technologies for the radio connections RC. Due to the small required transmission powers, ultra wide band technology (UWB) is also very'well suited. The gateway G can be a long distance transmission unit, e.g. a "Fieldgate" product of the firm, Endress+Hauser. In this case, the gateway G can communicate worldwide, for example via Internet, GSM or public switched telephone network, with a superordinated unit (not shown).

Figure 2:
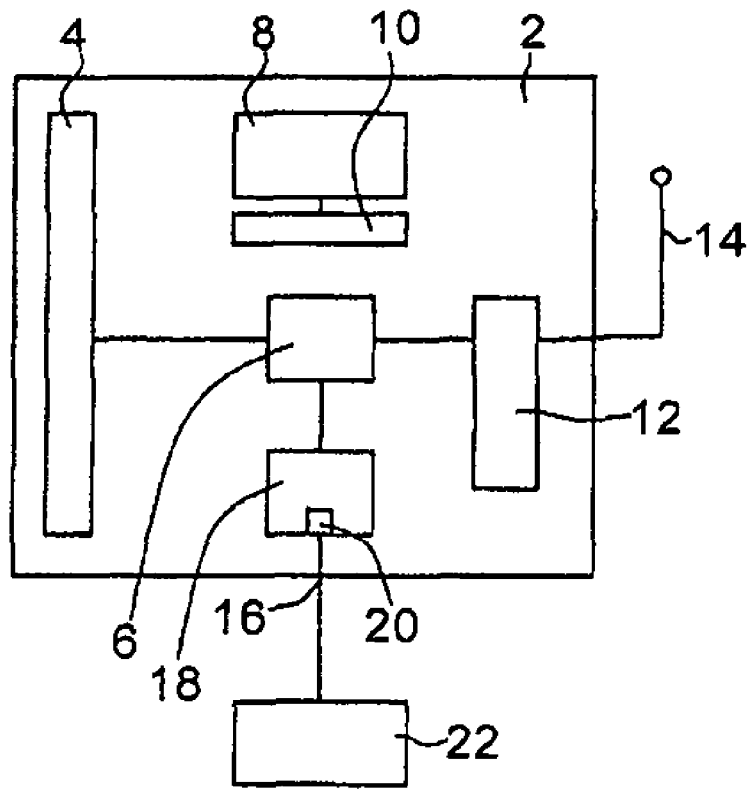
FIG. 2 is a schematic block diagram of a radio field device according to a first form of embodiment of the invention.

FIG. 2 shows a radio field device 2 according to a first form of embodiment. The radio field device 2 is embodied as a sensor and can, for example, be one of the radio field devices F1, F2, ..., F6, illustrated in FIG. 1. It includes a measured value transducer 4, a control unit in the form of a microprocessor 6, a battery 8 and a power supply 10 connected to the battery 8. For measured value processing, the microprocessor 6 is connected (as a rule, via an analog to digital converter and an amplifier) with the measured value transducer 4. The battery 8 forms a self-sufficient, or autarkic, electrical current source for supplying all system components of the radio field device 2. The power supply 10 transforms the voltage provided by the battery 8 to the one or more desired voltage values of the respective system components. The individual system components of the radio field device 2 are supplied with electrical power from the battery 8 via the power supply 10 and electrically conductive lines (not shown).

For data exchange with a superordinated unit (not shown), the microprocessor 6 is connected with a radio unit 12, which includes an RF chipset and an antenna 14. The radio unit 12 is embodied, in such case, in such a manner that wireless communication occurs according to the HART® standard. Additionally, the radio field device 2 includes a hardwire communication interface 16. The hardwire communication interface 16 is embodied, in turn, also according to the HART® standard. Associated with the hardwire communication interface 16 is an ASIC 18, by which the sending and/or receiving of digital signals via the hardwire communication interface 16 is performed and which is connected for data exchange with the microprocessor 6. In the case of sending digital signals, the ASIC 18 superimposes, according to the transmitted digital data (e.g. a bit stream of an ascertained length), on an electrical current signal (4-20 mA electrical current signal), digital signals according to the FSK (frequency shift keying) standard. Conversely, the ASIC 18 performs, during the receiving of digital signals superimposed on an electrical current signal according to the FSK standard, a filtering and converts the obtained digital communication signals into digital data (e.g. into a bit stream). Additionally, the ASIC 18 includes a carrier detect logic 20 as an integral component.

In the following, a manner of operation of the radio field device 2 will now be described. In the times, in which no measured value request is received by the superordinated unit via the radio unit 12, the radio field device 2 is operated in standby mode. Also, the ASIC 18 associated with the hardwire communication interface 16 is operated clocked during these times, wherein, in such case, active time periods, in which the ASIC 18 is activated, alternate with turned-off periods of time, in which the ASIC 18 is switched off. In such case, the active time periods and the turned-off time periods follow periodically one after the other, wherein, in order to reduce the power consumption of the ASIC 18 as much as possible, the active time periods are markedly shorter than the turned-off time periods.

If the radio unit 12 receives from the superordinated unit a measured value request, then the radio field device 2 is switched into active operation and, in known manner, a corresponding measuring is performed by the measured value transducer 4. The registered measured value is, in turn, transmitted in known manner wirelessly via the radio unit 12 to the superordinated unit. For the execution of such a measured value request, an activating of the ASIC 18 is not required, so that this is operated further in clocked mode for energy saving reasons. Following execution of the measured value request, the radio field device 2 is switched back into the standby mode. This switching is accomplished by the microprocessor 6, which is informed by the radio unit 12 of the termination of the communication procedure. The wireless interface of the radio field device 2, with which the radio unit 12 is associated, forms, accordingly, the main communication interface of the radio field device 2. By the clocked operation of the ASIC 18, the power consumption for providing a permanent availability of the hardwired interface 16 is significantly reduced.

In the following, the case is described, in which a HART® handheld communicator 22 is connected to the hardwire communication interface 16, in order to configure the radio field device 2 on-site. Before beginning the actual communication, the HART® handheld communicator 22 first sends a wake-up signal. This is, for example, formed by a digital signal having a bit stream in the form of a consecutive sequence of "1" and "0", i.e. a bit stream of the form "101010 ... ". The length of the wake-up signal is, in such case, longer than a turned off period of time of the ASIC 18. Following sending of the wake-up signal, the HART® handheld communicator 22 waits a predetermined amount of time, before it begins the actual communication, in order to assure, that the radio field device 2 is ready to receive.

The carrier detect logic 20 monitors, during the times, in which the ASIC 18 is activated, whether a digital signal (and not just noise) is being received by the ASIC 18. In the case of receipt of the wake-up signal, the carrier detect logic 20 sends a DCD signal (data carrier detected signal) to the microprocessor 6. The microprocessor 6 then switches the radio field device 2, which is, as a rule, in the standby mode, into active operation. Additionally, also the ASIC 18 is switched into durably active operation, so that the actual communication between the radio field device 2 and the HART® handheld communicator 22 can be performed. For this, there are sent from the HART® handheld communicator 22 corresponding configuration commands and configuration data as digital signals via the hardwire communication interface 16 to the ASIC 18. In the ASIC 18, the digital signals are converted into corresponding digital data and forwarded via a serial communication to the microprocessor 6. In corresponding, reverse manner, reports can be sent from the microprocessor 6 to the HART® handheld communicator 22. Following termination of the communication between the HART® handheld communicator 22 and the radio field device 2, the radio field device 2 is switched back into the standby mode. Additionally, the ASIC 18 is returned to clocked operation, so that the entire radio field device 2 is operated in an energy saving mode. In this way, life of the battery 8 is significantly lengthened in comparison to conventionally embodied radio field devices 2.

Figure 3:
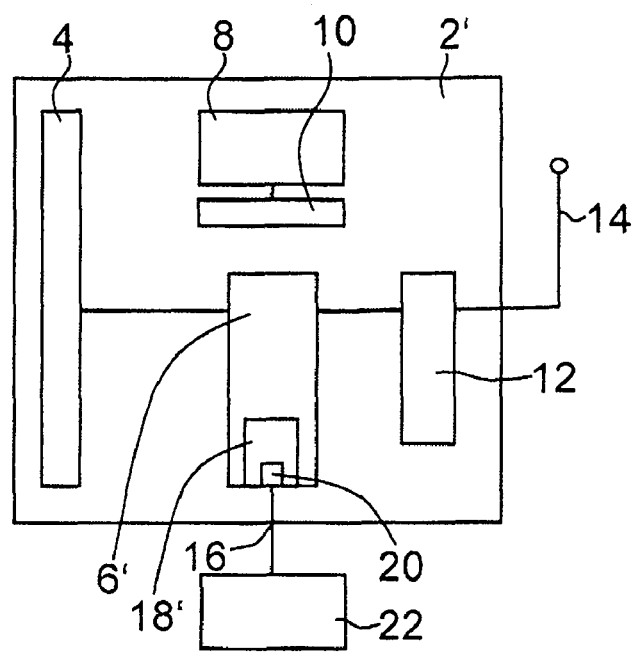
FIG. 3 is a schematic block diagram of a radio field device according to a second form of embodiment of the invention.

In the following, a second form of embodiment of a radio field device 2' of the invention is explained with reference to FIG. 3. In such case, equal components are provided with equal reference characters. In the following, only differences relative to the first form of embodiment are explored.

In contrast to the first form of embodiment, in the case of the radio field device 2', the functional unit 18' associated with the hardwire communication interface 16 is not embodied as a separate circuit. Rather, the functional unit 18' is integrated into the microprocessor 6' of the radio field device 2'. The functioning of the functional unit 18' corresponds, however, largely to the functioning explained with reference to the ASIC 18. If a digital signal is detected by the carrier detect logic 20, which is embodied integrally in the functional unit 18', then there is absent in the case of the present, second form of embodiment of the step, that a DCD signal must be sent to the microprocessor 6' from the carrier detect logic 20. Rather, directly in the case of registering of such a digital signal, the radio field device 2' is switched into active operation and the functional unit 18' is durably activated. Also the serial communication between the functional unit 18' and the microprocessor 6' explained in reference to the first form of embodiment is absent. In contrast to the first form of embodiment, thus, the DCD signal and the serial communication are implemented in software.

In the following, another form of embodiment of the present invention will now be explained with reference to FIG. 4. In such case, equal components are provided with equal reference characters. In the following, only differences relative to the first form of embodiment are explored.

Figure 4:
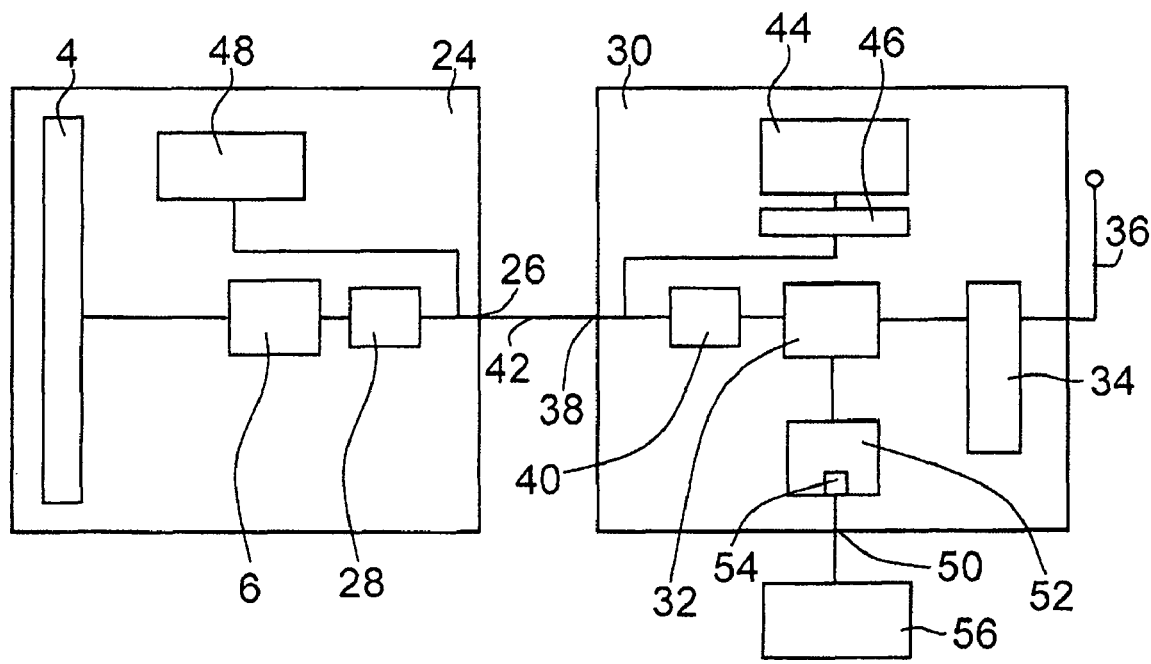
FIG. 4 is a schematic block diagram of a field device having a wireless adapter connected thereto.

FIG. 4 shows, schematically, a conventionally embodied field device 24 in the form of a sensor. The field device 24 includes, in such case, a measured value transducer 4 and a microprocessor 6, which are connected with one another for communication. Additionally, the field device 24 includes, connected with the microprocessor 6, a hardwire communication interface 26, with which is associated a functional unit 28, which performs the sending and/or receiving of digital signals via the hardwire communication interface 26. Functional unit 28 is formed by an ASIC. The hardwire communication interface 26 and the functional unit 28 are embodied according to the HART® standard.

Via the hardwire communication interface 26, the field device 24 can, for example, be connected to a HART® bus system and communicate with a superordinated unit. The field device 24 embodied is as a 2-conductor device. On the basis of these considerations, both the communication as well as also the electrical current supply occurs via a shared 2-conductor connection, which is formed at least partially by the hardwire communication interface 26. Additionally, a wireless adapter can be connected to the hardwire communication interface 26, such as shown in FIG. 4. In this way, the conventional field device 24 can be retrofitted to form a "radio field device", such as will now be explained in detail.

The wireless adapter 30 includes a microprocessor 32. For data exchange with a superordinated unit (not shown), the microprocessor 32 is connected with a radio unit 34, which includes an RF chipset and an antenna 36. The radio unit 34 is, in such case, embodied in such a manner, that the wireless communication occurs according to the HART® standard. Additionally, the wireless adapter 30 includes, connected with the microprocessor 32, a hardwire communication interface 38, with which a functional unit 40 is associated, which performs the sending and/or receiving of digital signals via the hardwire communication interface 38. The functional unit 40 is formed by an ASIC. The hardwire communication interface 38 and the functional unit 40 are embodied according to the HART® standard. In the case of the arrangement illustrated in FIG. 4, the hardwire communication interface 26 of the field device 24 and the hardwire communication interface 38 of the wireless adapter 30 are connected with one another via a 2-conductor, connecting line 42. Over this connection occurs both the communication (according to the HART® standard) as well as also the electrical current supply of the field device 24.

For providing the electrical current supply of the field device 24 (and the wireless adapter 30), the wireless adapter 30 includes an adapter battery 44 and an adapter power supply 46 connected to the adapter battery 44. The adapter battery 44 forms a self-sufficient, or autarkic, electrical current source for supplying all system components of the wireless adapter 30 and the thereto connected field device 24. The individual system components of the wireless adapter 30 are supplied with electrical power from the adapter battery 44 via the adapter power supply 46 and electrically conductive lines (not shown). The adapter power supply 46 is additionally connected to the hardwire communication interface 38 of the wireless adapter 30, so that the system components of the field device 24 are supplied with electrical power via the 2-conductor connecting line 42, the hardwire communication interface 26 of the field device 24 and a thereto connected, field device power supply 48. The corresponding lines of the field device power supply 48 to the individual system components of the field device 24 are not shown in FIG. 4. In the individual power supply parts 46 and 48 of the field device 24 and the wireless adapter 30, in such case, such as is known in the technical field, a voltage transformation is performed, in order to provide, on the one hand, in each case, the voltage values desired by the directly supplied system components and to provide, on the other hand, on the 2-conductor connecting line a sufficiently high voltage, that the field device 24 is supplied with enough electrical power. In such case, the individual power supply parts 46 and 48 (as well as equally the power supply 10 of FIGS. 2 and 3) can also be subdivided into a number of power supply stages.

The wireless adapter 30 includes another hardwire communication interface 50. The other hardwire communication interface 50 is embodied according to the HART® standard. Associated with the additional hardwire communication interface 50 is an ASIC 52, by which the sending and/or receiving of digital signals via the hardwire communication interface 50 is performed and which is connected with the microprocessor 32 for data exchange. The sending and receiving of digital signals occurs in corresponding manner, such as was explained above in reference on the ASIC 18 of FIG. 2. Additionally, ASIC 52 includes a carrier detect logic 54 as an integral component.

In the following, a manner of operation of the arrangement illustrated in FIG. 4 will now be described. The field device 24 and the wireless adapter 30 communicate via the hardwire communication interfaces 26, 38 and the 2-conductor-connecting line 42 according to the HART® standard. The wireless adapter 30, in turn, communicates according to the HART® standard wirelessly via the radio unit 34 with a superordinated unit (not shown). In the times, in which no measured value request (via the radio unit 34) is received from the superordinated unit, the field device 24 and the wireless adapter 30 are operated in standby mode. The functional units 28 and 40, which are associated with the two hardwire communication interfaces 26, 38, are durably activated.

If the radio unit 34 receives from the superordinated unit a measured value request, then the wireless adapter 30 is switched into active operation. Additionally, the measured value request is forwarded via the 2-conductor-connecting line 42 to the field device 24. The field device 24 is likewise switched into active operation and it performs, in known manner, a corresponding measuring by the measured value transducer 4. The registered measured value is transmitted via the 2-conductor connecting line to the wireless adapter 30 and from there via the radio unit 34, in known manner, wirelessly to the superordinated unit. For the execution of such a measured value request, an activating of the ASIC 52 is not required, so that this continues to operate clocked for energy saving reasons. Following execution of the measured value request, the field device 24 and the wireless adapter 30 are switched back into the standby mode.

If, on the additional hardwire communication interface 50 of the wireless adapter 30, a HART® handheld communicator 56 is connected, in order to configure the wireless adapter 30 on-site, then the HART® handheld communicator 56, in turn, first sends a wake-up signal. The detecting of the wake-up signal, the switching of the wireless adapter 30 into active operation, the durable activating of the ASIC 52 as well as the performing of the configuring occur in such case in manner corresponding to that described with reference to FIG. 2, wherein connection of the HART® handheld communicator 22 was explained. Following termination of the communication between the HART® handheld communicator 56 and the wireless adapter 30, the wireless adapter 30 is switched back into the standby mode. Additionally, the ASIC 52 is returned to clocked operation.

The present invention is not limited to the examples of embodiments illustrated in the figures. For example, in the case of the arrangement illustrated in FIG. 4, also one or both of the functional units 28 and 40, which are associated with the two hardwire communication interfaces 26 and 38, can be operated in a clocked fashion and in each case have a carrier detect logic, in the manner such as was explained above in reference to the ASIC 18 illustrated in FIG. 2. In this way, in a standby mode of the field device 24 and/or the wireless adapter 30, power consumption can be further reduced. Depending on from which side a communication via the 2-conductor connecting line 42 is initiated, the particular functional unit 28 and/or 40 can be switched by a corresponding wake-up signal from such side into durably active operation.

Additionally, there is the opportunity, also in the case of a conventional field device, which is not embodied as a radio field device, to operate in a clocked mode a functional unit of a hardwired fieldbus communication interface, via which the field device is connected to a (hardwired) fieldbus. In this way, the power consumption of the field device can be reduced and costs saved.

Instead of the explained carrier detect logic, also another mechanism can be applied, in order to detect, whether a communication via the hardware communication interface is to be performed. Especially when the communication to the fieldbus is not conducted via the hardwire communication interface, a switch can be provided on the hardwire communication interface, for example, which is activated by connection of an external device (e.g. a handheld communicator). The activating of the switch can occur, for example, mechanically, optically, electrically or magnetically. Following activating of the switch, in turn, the functional unit, which is associated with the hardwire communication interface, is switched into durably active operation.

The invention claimed is:

1. A field device of process automation technology, comprising:
   a hardwire communication interface; and
   a functional unit associated with said hardwire communication interface, said functional unit is embodied in such a manner, that it performs sending and/or receiving of digital signals via said hardwire communication interface, wherein:
   the field device is embodied in such a manner, that said functional unit is operated in clocked operation at least when the field device is operated in a standby mode, wherein, in the clocked operation, active time periods, in which said functional unit is activated, alternate with turned-off periods of time, in which said functional unit is switched off.

2. The field device as claimed in claim 1, wherein:
   said hardwire communication interface is formed by a fieldbus communication interface embodied preferably according to one of:
   the Profibus standard, the Foundation Fieldbus-standard and the Hart standard.

3. The field device as claimed in claim 1, further comprising:
   a service unit connectable to said hardwire communication interface, wherein:
   communication is conducted between said service unit and the field device via said hardwire communication interface.

4. The field device as claimed in claim 1, wherein:
   said functional unit is implemented in layers 1 and 2 of the OSI reference model (open system interconnection reference model), preferably exclusively in layer 1 of the OSI reference model.

5. The field device as claimed in claim 1, wherein:
   said functional unit is formed by one of: an ASIC (application specific integrated circuit) by an FPGA (field programmable gate array) and by an FPLA (field programmable logic array).

6. The field device as claimed in claim 1, wherein:
   functional unit includes a carrier detect logic, by which a digital signal incoming to said hardwire communication interface is registerable.

7. The field device as claimed in claim 1, wherein:
   the field device supplementally has a wireless fieldbus communication interface, preferably embodied according to one of: the Profibus standard, the Foundation Fieldbus-standard and the HART standard.

8. The field device as claimed in claim 1, further comprising:
   an autarkic electrical current source for supplying electrical power for the field device.

9. The field device as claimed in claim 1, wherein:
   during times in which the field device must not process measured value requests nor execute some other action, the field device can be operated in an energy saving, standby mode and the functional unit in energy saving, clocked operation.

10. The field device as claimed in claim 1, wherein:
    the active time periods, in each case, are equally long and the turned-off time periods, in each case, are equally long, so that a periodic sequence results.

11. The field device as claimed in claim 1, wherein:
    the active time periods are shorter than the turned-off time periods, so that the power consumption can be effectively reduced.

12. The field device as claimed in claim 1, wherein:
    when a digital signal is recognized at the functional unit, the field device is then switched into active operation and the functional unit is switched activated durably.

13. The field device as claimed in claim 1, wherein:
    a device connected to the communication interface and/or the a control unit provided in the field device, before performing a communication, send(s) a predetermined wake-up signal of a length, which is longer than a turned-off period of time of the functional unit.

14. A method for operating a field device of process automation technology, wherein the field device includes a hardwire communication interface and, a functional unit associated with the hardwire communication interface comprising the steps of:

the functional unit performs sending and/or receiving of digital signals via the communication interface, and operating the functional unit in clocked operation, wherein:

in the clocked operation, active time periods, in which the functional unit is activated, alternate with turned-off periods of time, in which the functional unit is switched off, wherein:

the functional unit at least is operated in clocked operation, when the field device is operated in standby mode.

15. The method as claimed in claim 14, wherein:

said active time periods and said turned-off time periods periodically follow one another; and said active time periods are preferably shorter than said turned-off time periods.

16. The method as claimed in claim 14, wherein:

when a digital signal is recognized at the functional unit, the field device is switched into active operation and the functional unit is durably activated.

17. The method as claimed in claim 14, wherein:

a device connected to the communication interface and/or a control unit provided in the field device, before performing a communication, sends a predetermined wake-up signal of a length, which is preferably longer than a turned off period of time of the functional unit.

18. The method as claimed in claim 14, wherein:

the field device communicates via a wireless connection, preferably via radio, with a superordinated unit.

19. The method as claimed in claim 14, wherein:

the field device is supplied autarkically with electrical power.

* * * * *